US006795534B2

United States Patent
Noguchi (10) Patent No.: US 6,795,534 B2
(45) Date of Patent: Sep. 21, 2004

(54) DATA RECORDING SYSTEM FOR IP TELEPHONE COMMUNICATION

(75) Inventor: Tadanori Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 09/944,187

(22) Filed: Sep. 4, 2001

(65) Prior Publication Data

US 2002/0027977 A1 Mar. 7, 2002

(30) Foreign Application Priority Data

Sep. 4, 2000 (JP) ........................................ 2000-266920

(51) Int. Cl.[7] .............................................. H04M 1/64
(52) U.S. Cl. .................... 379/88.17; 370/252
(58) Field of Search .................. 379/88.17, 93.09; 370/352, 252, 356, 260; 709/238

(56) References Cited

U.S. PATENT DOCUMENTS 6,122,665 A * 9/2000 Bar et al. ................. 379/88.17
6,282,269 B1 * 8/2001 Bowater et al. .......... 379/88.17
6,366,961 B1 * 4/2002 Subbiah et al. ............. 709/238
6,487,196 B1 * 11/2002 Verthein et al. .......... 379/93.09
6,529,501 B1 * 3/2003 Zhao et al. ................ 379/88.17
6,539,077 B1 * 3/2003 Ranalli et al. ........... 379/88.17

FOREIGN PATENT DOCUMENTS

JP   A 2000-151694   5/2000
JP   A 2000-286899   10/2000

* cited by examiner

*Primary Examiner*—Fan Tsang
*Assistant Examiner*—Gerald Gauthier
(74) *Attorney, Agent, or Firm*—Young & Thompson

(57) ABSTRACT

A data recording system for IP telephony avoids lost voice data due to loss of IP packets during transmission, includes a recording device connected to the IP network and capable of recording audio data transmitted between telephone terminals. On communication, speech IP packets corresponding to audio data are transmitted between telephone terminals by way of the network in approximately real time and recording. IP packets corresponding to the audio data for the communication are transmitted to the recording device by way of the network in a way that does not cause any IP packet loss during transmission and that is not performed in real time, thereby recording the audio data by the recording device.

22 Claims, 10 Drawing Sheets

DATA RECORDING SYSTEM FOR IP TELEPHONE COMMUNICATION

BACKGROUND OF THE INVENTION

1. Field of the Invention

The present invention relates to a data recording technique for the so-called IP or Internet telephony. More particularly, the invention relates to a data recording system for IP telephony that realizes approximately the same voice or speech communication as the conventional, ordinary telephony by the use of the Internet Protocol (IP) and the IP-based computer network.

With IP telephony, voice or audio data (i.e., audio data) to be transmitted is divided into IP packets (i.e., audio IP packets) and then, these packets are successively sent from a telephone terminal to another distant from it by way of an IP-based computer network. When audio data is transmitted using IP telephony, audio IP packets corresponding to the audio data need to be processed in real time. On the other hand, if audio data is transmitted as it is, it is impossible to ensure a required frequency bandwidth for data transmission. This is because the IP based network is of the so-called "best effort" type. As a result, conventionally, audio data is usually transmitted using the User Datagram Protocol (UDP) and the Realtime Transport Protocol (RTP) for the transport layer of the well-known OSI (Open Systems Interconnection) reference model.

With IP telephony, voice or audio data (i.e., audio data) to be transmitted is divided into IP packets (i.e., audio IP packets) and then, these packets are successively sent from a telephone terminal to another distant from it by way of an IP-based computer network. When audio data is transmitted using IP telephony, audio IP packets corresponding to the audio data need to be processed in real time. On the other hand, if audio data is transmitted as it is, it is impossible to ensure a required frequency bandwidth for data transmission. This is because the Ip-based network is of the so-called "best effort" type. As a result, conventionally, audio data is usually transmitted using the User Datagram Protocol (UDP) and the Realtime Transport Protocol (RTP) for the transport layer of the well-known OSI (Open Systems Interconnection) reference model.

Since IP telephony uses the IP protocol for data transmission, part of the IP packets tend to be lost during transmission and the packets thus lost are automatically resent from the telephone terminal from which the lost IP packets are originated. Generally, the loss rate of the IP packets during transmission varies dependent on the current amount of the traffic on an IP-based network. Thus, there is a problem the voice or speech communication quality is likely to deteriorate.

Moreover, the amount of the traffic on an IP network fluctuates at all times and abrupt increase of the traffic amount is unable to be anticipated. If the fluctuation of the traffic amount can be controlled to an extent by a process such as giving the order of priority to the audio IP packets, the above-described problem about the communication quality deterioration may be suppressed. In this case, however, not only the functions of routers connected to the network but also the entire operation of the network itself need to be additionally controlled. Thus, it is not realistic.

Additionally, even if only the operation of the IP telephone terminal is controlled to give the order of priority to the audio IP packets, it is difficult to make sure that the audio data packets are transmitted through the network as intended.

Furthermore, if the loss rate of the audio packets increases when the amount of traffic is large, the packet retransmission process and/or the congestion control process is/are not performed, where only the real-time process using the RTP protocol is carried out. Therefore, in this case, the speech quality deterioration becomes more conspicuous.

Considering the above-described characteristics of IP telephony, conventionally, a function to complement the lost IP packets during transmission is incorporated into the IP telephone terminal and/or the IP telephone subscriber circuit of an exchange. This lost-packet complementing function is implemented by anticipating the audio data contained in a lost IP packet based on its precedent and subsequent audio data. Therefore, the audio data complemented by this function does not accord perfectly with that contained in the lost packet. Although various researches on the lost-packet complementing function have been conducted, it is unable to realize complete reproduction of the original voice or speech as long as this function is used.

The complement of the lost packet is more difficult if the loss rate of the packets increases furthermore as the traffic increases. This means that in this case, the complemented data is noticeably different from the original one. Thus, the reproduced speech tends to include some sensible distortion.

As explained above, when audio data is transmitted over the IP-based network, the quality of the reproduced speech is affected by the fluctuation of uncontrollable traffic. Thus, to keep the quality degradation and the transmission delay of audio data over the IP network at the same level as the conventional, ordinary telephony by way of the telephone lines, a control method using the TOS (Type of Service) field included in the header of an IP packet may be adopted, for example. However, in this method, high performance routers capable of interpreting the content of the TOS field are required over the whole IP-based network. As a result, this method is difficult to be adopted practically.

Moreover, a voice or sound recording method on a magnetic tape or the like (which has been incorporated in the conventional telephone-answering machines) may be adopted to realize approximately the same quality degradation and approximately the same transmission delay over the IP-based network as the conventional, ordinary telephony. Ordinary telephone-answering machines record directly the voice or speech generated by the handset of a telephone on a magnetic tape. If this direct recording method in the ordinary answering machine is applied to the IP telephone terminal, there is a possibility that the quality of reproduced voice or speech tends to degrade due to the loss of IP packets described previously. As a result, even if the voice or speech generated by the IP telephone terminal is directly recorded on a magnetic tape, the above-identified disadvantage of IP telephony (i.e., the complete reproduction of original voice or speech is impossible) is unable to be solved.

SUMMARY OF THE INVENTION

Accordingly, an object of the present invention is to provide a data recording system for IP telephony that complements perfectly the lost audio data due to loss of the IP packets during transmission.

Another object of the present invention is to provide a data recording system for IP telephony that eliminates the necessity of the lost-packet complementing function for the lost audio IP packets.

The above objects together with others not specifically mentioned will become clear to those skilled in the art from the following description.

A data recording system for IP (Internet Protocol) telephony according to the invention comprises;

(a) an IP-based network;
(b) a first telephone terminal connected to the network;
the first telephone terminal being capable of transmission and reception of audio data in the form of IP packets, making communication using an IP;
(c) a second telephone terminal connectable directly to the network or indirectly thereto by way of an exchange;
the second telephone terminal being capable of speech communication; and
(d) a recording device connected to the network;
the recording device being capable of recording audio data transmitted between the first telephone terminal to the second telephone terminal;
wherein when communication is performed between the first telephone terminal and the second telephone terminal, speech IP packets corresponding to audio data are formed and then, the speech IP packets thus formed are transmitted between the first telephone terminal and the second telephone terminal by way of the network in approximately real time; and
wherein recording IP packets corresponding to the audio data are formed and then, the recording IP packets are transmitted to the recording device by way of the network in a way that does not cause any IP packet loss during transmission and that is not performed in real time, thereby recording the audio data by the recording device.

With the data recording system according to the invention, the recording device connected to the IP-based network is provided, where the recording device is capable of recording the audio data transmitted between the first and second telephone terminals. When speech communication is performed between the first and second telephone terminals, the speech IP packets corresponding to the audio data are formed and then, they are transmitted between the first and second telephone terminals by way of the network in approximately real time. On the other hand, the recording IP packets corresponding to the audio data are formed and then, the recording IP packets are transmitted to the recording device by way of the network in the way that does not cause any IP packet loss during transmission and that is not performed in real time. The audio data thus transmitted is recorded by the recording device.

Thus, communication is performed with the speech IP packets transmitted over the network in real time. At the same time as this, the audio data transmitted by the recording IP packets is recorded by the recording device, where the recording IP packets are not lost during transmission and the transmission is not carried out in real time.

Accordingly, if the audio data stored in the recording device is read out for reproduction after the communication is finished, all the audio data transmitted by the speech IP packets without IP packet loss over the network can be reproduced. In other words, the necessity of the lost-packet complementing function for the lost audio IP packets is eliminated, which realizes defect-free speech or voice communication between the first and second terminals.

In a preferred embodiment of the system according to the invention, the recording IP packets are transmitted to the recording device using the Transmission Control Protocol (TCP) for the transport layer of the OSI reference model. In this embodiment, the recording IP packets are transmitted to the recording device using the TCP that conducts error-recovering processes during transmission such as an automatic packet-resending process. Thus, defect-free speech/voice communication can be easily realized without the use of the lost-packet complementing function.

In another preferred embodiment of the system according to the invention, the speech IP packets are transmitted over the network using the UDP and the RTP. In this embodiment, the speech IP packets are transmitted over the network using the UDP and the RTP and therefore, they are transmitted over the network in approximately real time like the conventional IP telephony. If some of the speech IP packets are lost during transmission, the lost IP packets are complemented by anticipating the audio data contained in the lost IP packets based on their precedent and subsequent audio data, thereby enabling the substantially real-time speech communication.

In still another preferred embodiment of the system according to the invention, the recording device is designed to be recordable only when the first telephone terminal is in an off-hook state. In this embodiment, the recording device does not record the recording IP packets when the first telephone terminal is in an on-hook state and therefore, there is an additional advantage that the running cost of the system decreases surely.

In a further preferred embodiment of the system according to the invention, the recording device starts its recording operation based on a recording start order emitted from the first telephone terminal. In this embodiment, the recording device starts its recording operation according to the intention of the user of the first telephone terminal and therefore, a necessary part of the communication is selectively recorded. Thus, there is an additional advantage that the limited volume of a recording medium of the recording device is efficiently used.

In a still further preferred embodiment of the system according to the invention, the recording device is designed to finish its recording operation by an on-hook operation of the first telephone terminal. In this embodiment, there is an additional advantage that the recording operation of the device is surely prevented in the on-hook state of the first telephone terminal after the communication is finished.

In a still further preferred embodiment of the system according to the invention, the recording device finishes its recording operation based on a recording stop order emitted from the first telephone terminal. In this embodiment, the recording device finishes its recording operation according to the intention of the user of the first telephone terminal and therefore, a necessary part of the communication is selectively recorded. Thus, there is an additional advantage that the limited volume of a recording medium of the recording device is efficiently used.

In a still further preferred embodiment of the system according to the invention, the recording device is designed to record in such a way that the speech IP packets from the first telephone terminal and those from the second telephone terminal or the exchange are independent from each other. In this embodiment, there is an additional advantage that the audio data from the first terminal and that from the second terminal or the exchange can be reproduced separately. Thus, even if the audio data from the first terminal and that from the second terminal or the exchange are overlapped and difficult to be heard, they can be clearly heard by reproducing them separately.

In this embodiment, preferably, the recording device is designed to record a real time value of a first one of the recording IP packers from the first telephone terminal and a real time value of a first one of the recording IP packets from the second telephone terminal or the exchange. In this case, there is an additional advantage that the time sequence of the recorded audio data from the first terminal and the time sequence of the recorded audio data from the second terminal or the exchange can be identified separately.

In this case, preferably, the recording device is designed to reproduce the recorded audio data from the first telephone terminal and the recorded audio data from the second telephone terminal or the exchange according to their real time sequence, respectively. In this case, there is an additional advantage that the voice or speech communication between the first and second telephone terminals can be entirely reproduced with the recording device.

In a still further preferred embodiment of the system according to the invention, the recording device is formed by an information-processing device (e.g., a personal computer or server computer) connected to the network. In this embodiment, there is an additional advantage that the audio data is easily recorded and easily reproduced, because a storage device incorporated into a computer serving as the recording device can be used for recording and reproduction of the audio data.

In a still further preferred embodiment of the system according to the invention, the first telephone terminal and the recording device are united together. In this embodiment, there is an additional advantage that the recording and reproducing operations of the audio data corresponding to the recording IP packets are easily performed if the user operates the first telephone terminal. There is another additional advantage that if the first telephone terminal is formed by software running on an information-processing device, the recording device can be formed by a storage device of the information-processing device.

In the system of the invention, the second telephone terminal may be connected indirectly to the network by way of the exchange. In this case, the second telephone terminal is capable of voice or speech communication with the first telephone terminal by way of the exchange and the network. On the other hand, the second telephone terminal may be connected directly to the network. In this case, the second telephone terminal is capable of transmission and reception of the audio data in the form of IP packets, making voice or speech communication using the IP.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

First Embodiment

Figure 1:
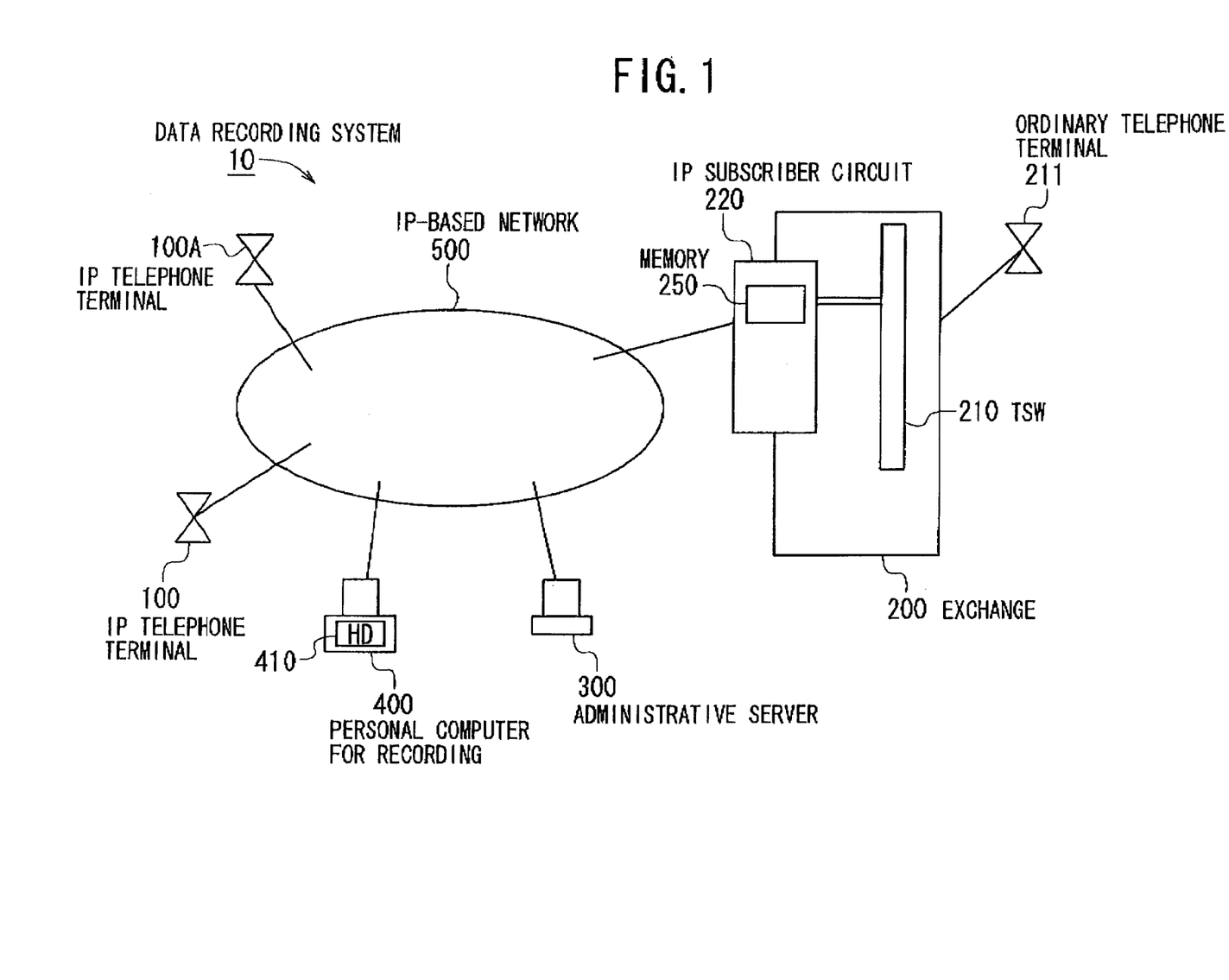
FIG. 1 is a functional block diagram showing the configuration of a data recording system for IP telephony according to a first embodiment of the invention.
Figure 2:
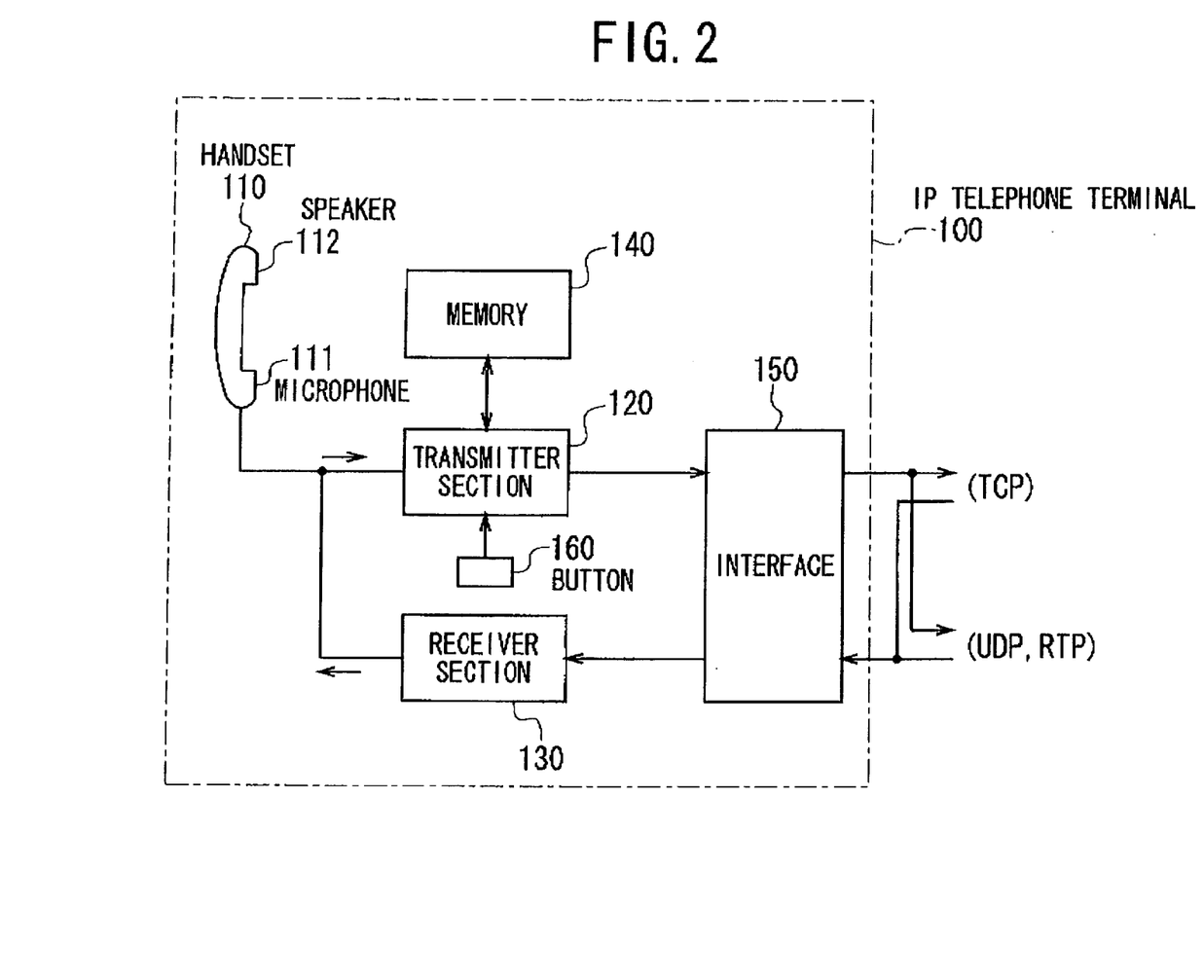
FIG. 2 is a functional block diagram showing the configuration of the IP telephone terminal used in the system according to the first embodiment of FIG. 1.

As shown in FIG. 1, a data recording system 10 for IP telephony according to a first embodiment comprises two IP telephone terminals 100 and 100A, an exchange 200, an administrative server 300, a personal computer 400 for data recording, and an IP-based network 500. An ordinary telephone terminal 211 is connected to the network 500 by way of the exchange 200. Needless to say, other ordinary telephone terminals (not shown) are connected to the network 500 by way of the exchange 200. However, only one terminal 211 is shown in FIG. 2 for simplification.

Although two IP telephone terminals 100 and 100A and one recording computer 400 are shown in FIG. 1 for the sake of simplification, any other IP telephone terminal or terminals and/or any other recording computer or computers may be added to the configuration of FIG. 1 as necessary.

The IP-based network 500 is formed by a computer network or a group of computer networks using the Internet Protocol (e.g., the global Internet or private computer networks such as LANs and WANs).

The telephone terminal 100 is a terminal for realizing IP telephony with an interface for IP packet transmission. The terminal 100 has a specific telephone number like conventional, ordinary telephones. The terminal has the configuration shown in FIG. 2.

The IP telephone terminal 100A has the same configuration and the same operation as those of the terminal 100. Therefore, the explanation about the terminal 100 is mainly made below.

As shown in FIG. 2, the terminal 100 comprises a handset (a transmitter/receiver unit) 110, a transmitter section 120, a receiver section 130, a memory 140, and an interface 150. The interface is used for interconnection of the terminal 100 to the IP-based network 500.

If the user lifts the handset 110 from the body of the terminal 100 by the hand for speech or talk, the terminal 100 is turned into the off-hook state where communication is possible. Thereafter, if the user put the handset 110 on the body of the terminal 100 at the end of speech or talk, the terminal 100 is returned to the on-hook state where communication is impossible.

The handset 110 has a microphone 111 and a speaker 112. The microphone 111 collects the user's voice (or sound) at the terminal 100 and converts it into an electric audio signal. The electric audio signal thus formed is sent to the transmitter section 120 and then, sent out to the network 500 by way of the interface 150 in the form of IP packet. The speaker 112 emits voice (or sound) from the person the user of the terminal 100 is speaking to by reconverting its electronic audio signal into the voice (or sound). The electric audio signal thus reproduced is sent to the interface 150 and the network 500 in the form of IP packets from the opponent of the user and then, it is further sent to the speaker 112 through the receiver section 130, emitting the opponent's voice.

The telephone terminal 100 is usually configured by the combination of specific hardware (e.g., a sound card and a microphone) and a software program operable on a personal computer (PC) providing a telephony function. However, needless to say, the terminal 100 may have a configuration like the ordinary telephone configuration, if possible.

The operation of the transmitter section 120 during the off-hook state is as follows.

The telephone terminal 100 has the "recording mode" where the speech or talk is recorded by the recording computer 400 (i.e., the recording operation is active) and the "non-recording mode" where the speech or talk is not recorded by the computer 400 (i.e., the recording operation is inactive).

In the non-recording mode, the transmitter section 120 generates IP packets corresponding to the electric audio signal generated by the microphone 111 on the handset 110 (i.e., IP packets corresponding to the user's voice or audio data) and transmits them to the outside of the terminal 100 (i.e., the network 500) by way of the interface 150. At this time, these IP packets are sent to the network 500 using the UDT and the RTP for the transport layer of the OSI reference model. The IP packets thus sent from the terminal 100 are further sent to the subscriber circuit 220 of the exchange 200 by way of the network 500.

The IP packets corresponding to the user's voice data sent from the terminal 100 are termed the "speech IP packets". The user's voice data may include any sound data other than the user's voice.

In the recording mode, like the operation of the non-recording mode, the transmitter section 120 generates the speech IP packets corresponding to the user's voice data and transmits them to the subscriber circuit 220 or the exchange 200 by way of the network 500. At the same time as this, the section 120 stores the data of the speech IP packets in the memory 140. Thereafter, the section 120 reads out the data of the packets from the memory 140 and transmits them to the outside of the terminal 100 using the TCP (not the UDP and the RTP) for the transport layer of the OSI reference model. These packets thus transmitted from the section 120 using the TCP are sent to the recording computer 400 by way of the network 500. These IP packets are termed the "recording IP packets", because they are formed and transmitted for recording in the memory 140.

The operation of the receiver section 130 during the off-hook state is the same in both the non-recording mode and the recording mode. The section 130 receives the IP packets (i.e., the speech IP packets) that are sent from the subscriber circuit 220 of the exchange 200 by way of the network 500 and the interface 150. The speech IP packets correspond to the voice data of the user of a distant telephone terminal from the terminal 100. The section 130 transmits the speech IP packets thus received to the speaker 112 on the handset 110, reproducing the voice of the person the user is talking with at the distant terminal.

The telephone terminal 100 further comprises a recording button 160. If the user operates the button 160, the recording mode and the non-recording mode of the transmitter section 120 are alternately switched or activated and at the same time, a specific IP packet for instructing the start and end of the recording operation of the computer 400 is transmitted toward the computer 400. The button 160 is, for example, of the toggle type. If the user operates the button 160 for the first time, the telephone terminal 100 is turned into the recording mode and then, it emits the instruction packet for starting the recording operation to the computer 400. If the user operates the button 160 for the second time, the terminal 100 is returned to the non-recording mode and then, it emits the instruction packet for stopping the recording operation to the computer 400. The same operation sequence is repeated if the user operates the button 160 in the same way later.

When the terminal 100 is in the recording mode in the off-hook state, a lamp (not shown) provided for the button 160 is turned on. This is to show the user that the speech is recordable or not. Preferably, the color of the lamp varies between the recording and non-recording modes. For example, the button 160 is formed in such a way that the lamp emits "green" light in the non-recording mode while it emits "red" light in the recording mode.

Additionally, the telephone terminal 100 is designed to enter the non-recording mode at the start of operation (i.e., at the start of speech or communication).

Figure 4:
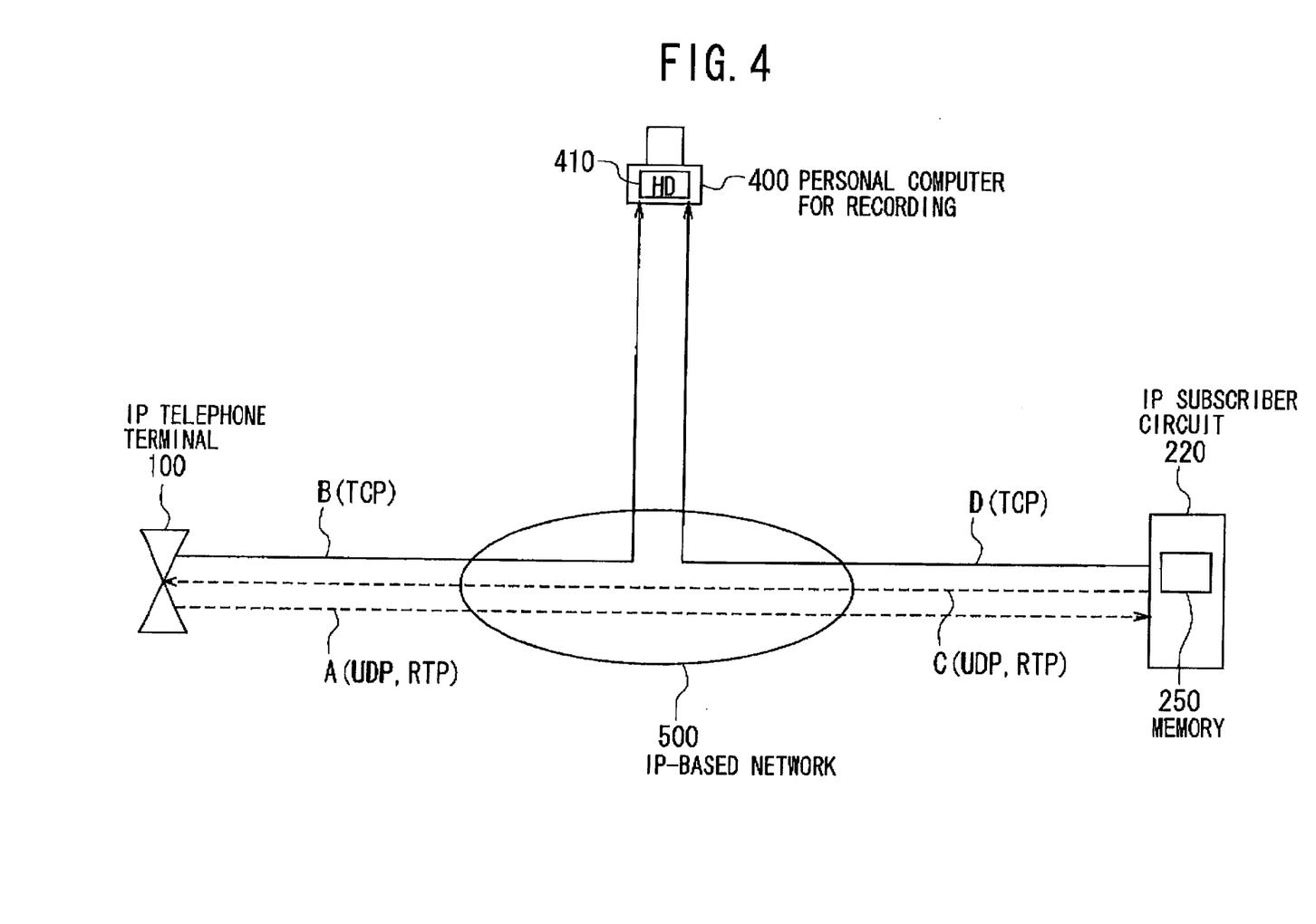
FIG. 4 is a schematic diagram showing the transmission of the IP packets among the telephone terminal, the subscriber circuit of the exchange, and the recording computer in the system according to the first embodiment of FIG. 1.

FIG. 4 shows the flow of the speech and recording IP packets among the terminal 100, the subscriber circuit 220, and the recording computer 400.

In the non-recording mode, as indicated by the arrow A, the telephone terminal 100 generates the "speech IP packets" corresponding to the user's voice and transmits them to the exchange 200 by way of the network 500 using the UDT and the RTP for the transport layer of the OSI reference model. In the recording mode, as indicated by the arrow B, the terminal 100 generates the "recording IP packets" corresponding to the user's voice and transmits them to the recording computer 400 by way of the network 500 using the TCP for the transport layer of the OSI reference model.

The exchange 200 is an upper apparatus that includes the telephone terminals 100 and 100A, which comprises a transmission switch (TSW) 210 and a subscriber circuit 220.

The TSW 210 is used to interconnect the subscriber circuit 220 to the remote telephone terminal 211 by way of public telephone networks. The terminal 211 has an ordinary telephone configuration connected to the public telephone networks.

Figure 3:
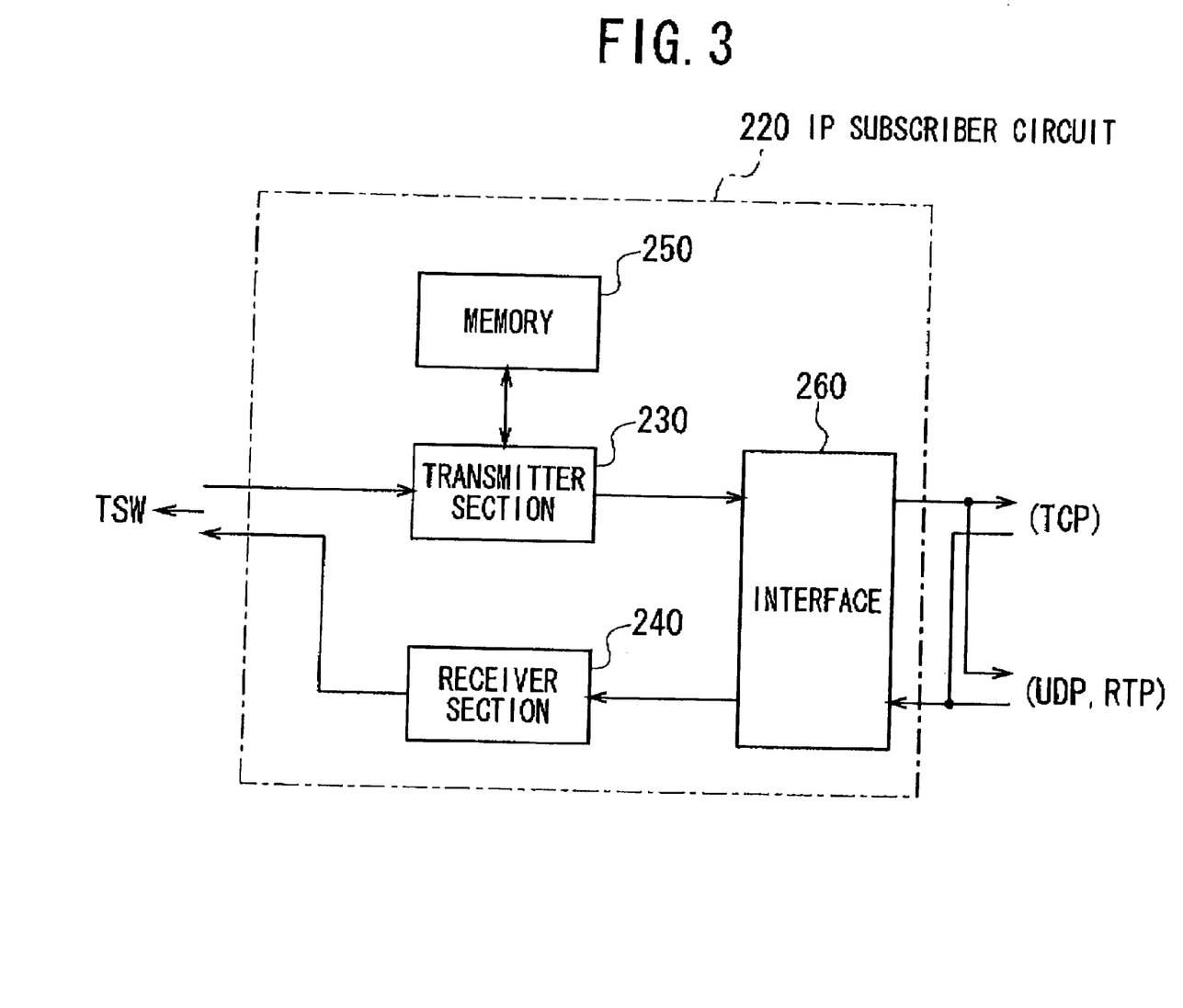
FIG. 3 is a functional block diagram showing the configuration of the IP subscriber circuit used in the system according to the first embodiment of FIG. 1.

The subscriber circuit 220 comprises, as shown in FIG. 3, a transmitter section 230, a receiver section 240, a memory 250, and an interface 260 for interconnection of the terminal 211 to the IP-based network 500. The circuit 220 provides the communication function between the exchange 200 and the terminals 100 and 100A by way of the network 500 and the intermediary function between the local terminals 100 and 100A and the remote terminal 211 by way of the TSW 210.

Like the telephone terminal 100, the Ip subscriber circuit 220 has the "recording mode" where the speech is recorded by the computer 400 (i.e., the recording operation is active) and the "non-recording mode" where the speech is not recorded by the computer 400 (i.e., the recording operation is inactive).

In the non-recording mode of the circuit 220, the transmitter section 230 generates the "speech IP packets" corresponding to the electric audio signal generated by the distant telephone terminal 211 (i.e., the IP packets corresponding to the user's voice data at the terminal 211) and transmits them to the outside of the circuit 220. The section 230 transmits the speech IP packets using the UDT and RTP for the transport layer. The packets thus transmitted from the section 230 are sent to the terminal 100 by way of the network 500.

In the recording mode of the circuit 220, like the operation of the non-recording mode, the transmitter section 230 generates the speech IP packets corresponding to the user's voice data at the terminal 211 and transmits them to the terminal 100 by way of the network 500. At the same time as this, the section 230 stores the speech IP packets in the memory 250. The section 230 reads out the packets from the memory 250 and transmits them to the outside of the circuit 220 using the TCP for the transport layer. The packets thus transmitted from the section 230 using the TCP (i.e., the recording IP packets) are sent to the recording computer 400 by way of the network 500.

The operation of the receiver section 240 in the off-hook state is the same in both the non-recording mode and the recording mode. Specifically, the section 240 receives the speech IP packets sent from the telephone terminal 100 by way of the network 500 and transmits the packets thus received to the distant terminal 211 by way of the TSW 210 and the public telephone network.

The switching operation of the circuit 220 between the recording and non-recording modes is performed with the instruction IP packet for starting the recording operation and that for stopping the same. These instruction packets are transmitted from the terminal 100 through the recording computer 400. The transmission of these instruction packets at the computer 400 occurs on receipt of the instruction packets from the terminal 100.

In the non-recording mode, as indicated by the arrow C in FIG. 4, the subscriber circuit 220 generates the "speech IP packets" corresponding to the user's voice at the remote telephone terminal 211. Then, the circuit 220 transmits them to the terminal 100 by way of the network 500 using the UDT and RTP for the transport layer.

In the recording mode, the subscriber circuit 220 conducts the same operation as that in the non-recording mode, as indicated by the arrow C in FIG. 4. Moreover, as indicated by the arrow D, the circuit 220 generates the "recording IP packets" corresponding to the user's voice at the terminal 211, and it transmits them to the recording computer 400 by way of the network 500 using the TCP for the transport layer.

The administrative server 300, which is formed by a suitable information processor terminal such as a personal or server computer, is connected to the network 500. The main functions of the server 300 are "IP address assignment" to the terminals 100 and 100A and the subscriber circuit 220 of the exchange 200, "control information monitoring" for monitoring the various types of control information for the IP network 500, and "control information management" for managing these types of control information.

Here, the server 300 is independently provided and connected to the network 500. However, the server 300 may be incorporated into the subscriber circuit 220, in other words, the circuit 220 may provide the whole functions of the server 300. Additionally, if the IP address for the terminals 100 and 100A and the circuit 220 is fixed, the "IP address assignment" function of the server 300 can be omitted.

The recording computer 400, which is connected to the network 500, may have the same function as the telephone terminal 100. This can be easily realized by running an application program that provides the telephone function on the computer 400.

Figure 5:
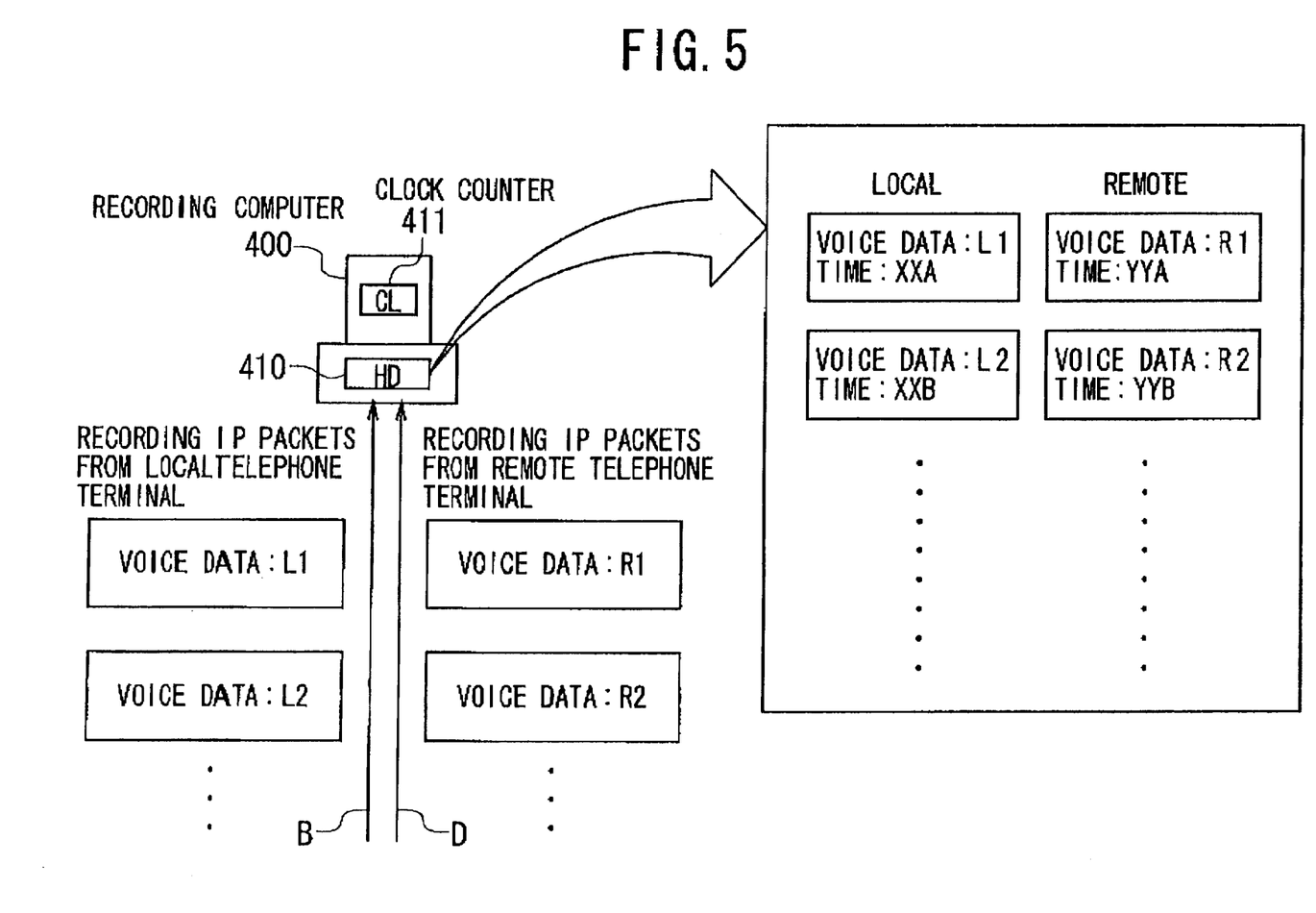
FIG. 5 is a schematic diagram showing the state or form of the voice and time data recorded in the storage device of the recording computer used in the system according to the first embodiment of FIG. 1.

The recording computer 400 receives the "recording IP packets" transmitted from the local IP telephone terminal 100 connected to the network 500 and those transmitted from the remote telephone terminal 211 by way of the subscriber circuit 220. The recording IP packets, which are transmitted using the TCP for the transport layer, are recorded on an auxiliary storage device 410 (e.g., a hard disk drive) incorporated into the computer 400. The computer 400 conducts its recording operation as follows:

As shown in FIG. 5, each of the recording IP packets (which correspond to the VOICE DATA: L1, L2, ...) from the local telephone terminal 100 is stored in the storage device 410 to have a link with its real time data (XXA, XXB, ...) at which the packet has been transmitted from the terminal 100. Similarly, each of the recording IP packets (which correspond to the VOICE DATA: R1, R2, ...) from the remote telephone terminal 211 is stored in the same storage device 410 to have a link with its real time data (YYA, YYB, ...) at which the packet has been transmitted from the terminal 211.

When the recording computer 400 reproduces the voice data L1, L2, ... and R1, R2, ... stored in the device 410, it starts its reproduction operation from the first data L1 or R1 with its earliest real time value. At this time, the computer 400 starts its built-in clock simultaneously with the start of this reproduction operation. Thereafter, the computer 400 reproduces successively the subsequent voice data stored in the device 410 according to the real time values linked with the individual packets. Thus, the computer 400 can reproduce the voice data L1, L2, ... and R1, R2, ... stored in the device 410 in time series.

Next, the operation of the data recording system 10 according to the first embodiment is explained below with reference to FIGS. 6 and 7.

Figure 6:
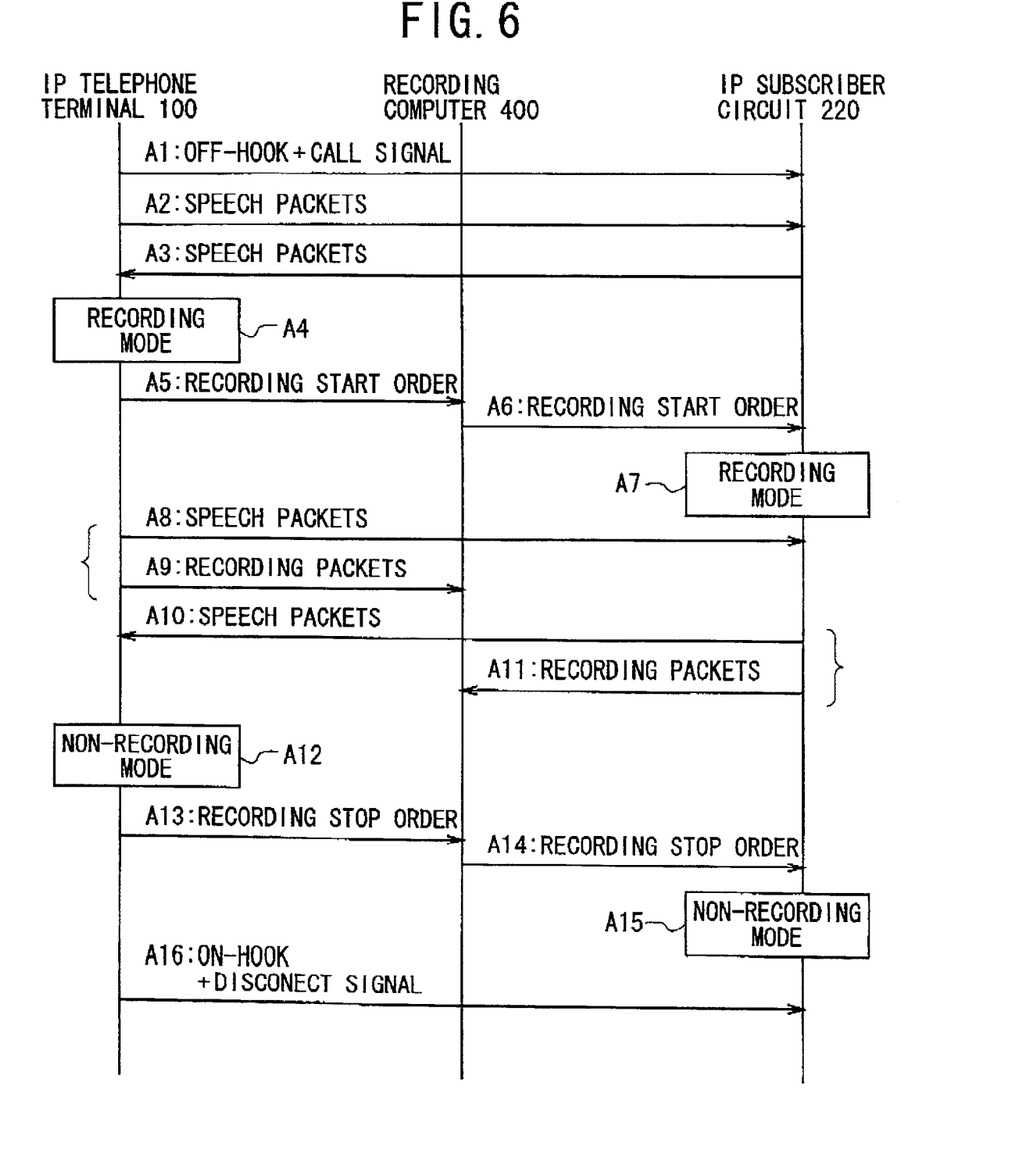
FIG. 6 is a sequence diagram showing the sequence of the whole operation of the system according to the first embodiment of FIG. 1.

FIG. 6 shows the sequence of the whole operation of the data recording system according to the first embodiment of FIG. 1 in the non-recording mode.

First, when the user of the local telephone terminal 100 lifts the handset 110 from the body, the terminal 100 is turned into the off-hook state. Then, the user dials the number of the remote telephone terminal 211. The subscriber circuit 220 of the exchange 200 connects the local terminal 100 to the remote terminal 211 by way of the TSW 210 of the exchange 200. Thus, as shown by the reference character A1, these two terminals 100 and 211 are interconnected by way of the circuit 220 and the network 500. In this state, the speech IP packets corresponding to the speech data at the terminals 100 and 211 are transferred between the terminal 100 and the circuit 220 using the UDP and RTP for the transport layer.

For example, if an electric audio signal is inputted into the transmitter section 120 from the handset 110 of the terminal 100, the section 120 converts the signal to IP packets and then, sent them to the circuit 220 by way of the network 500 as the "speech IP packets", as shown by the reference character A2. On the contrary, if an electric audio signal is sent to the circuit 220 from the remote terminal 211, the transmitter section 230 of the circuit 220 converts the signal to IP packets and then, sent them to the terminal 100 by way of the network 500 as the "speech IP packets", as shown by the reference character A3. Thus, ordinary bidirectional voice communication or conversation is possible between the terminals 100 and 211.

If some of the "speech IP packets" are lost during transmission, the lost packets are complemented by anticipating the sound data contained in the lost packets based on their precedent and subsequent sound data. This is the same as the conventional complementing method referred in BACKGROUND OF THE INVENTION. However, any other complementing method may be used for this purpose.

When the user of the local terminal 100 operates its recording button 160 in the initial non-recording mode, the operation of the terminal 100 is turned into the recording mode from the non-recording mode, as indicated by the reference character A4. Then, the terminal 100 transmits an IP packet for the "recording start order" to the recording computer 400 by way of the network 500, as indicated by the reference character A5. In response to the recording start order, the computer 400 transmits an IP packet for the "recording start order" to the circuit 220 by way of the network 500, as indicated by the reference character A6. Thus, the operation of the circuit 220 is turned into the recording mode, as indicated by the reference character A7.

After both the local terminal 100 and the circuit 220 are turned into their recording modes, the terminal 100 sends the speech IP packets to the circuit 220 and vice versa using the UDP and RTP for the transport layer. At the same time, the terminal 100 and the circuit 220 send their recording IP packets to the recording computer 400 using the TCP for the transport layer.

For example, if an electric audio signal is inputted into the transmitter section 120 from the handset 110 of the local terminal 100, the section 120 converts the signal to IP packets and then, sent them to the circuit 220 by way of the network 500 as the "speech IP packets", as shown by the reference character A8. Moreover, the section 120 converts the signal to IP packets and then, stores the data of the packets into the memory 140. Thereafter, the section 120 reads out the data stored in the memory 140 and sends them to the computer 400 by way of the network 500 as the "recording IP packets", as shown by the reference character A9.

In contrast, if an electric audio signal is sent to the circuit 220 from the remote terminal 211, the transmitter section 230 of the circuit 220 converts the signal to IP packets and then, sent them to the terminal 100 by way of the network 500 as the "speech IP packets", as shown by the reference character A10. At the same time, the transmitter section 230 converts the signal to IP packets and then, stores the data of the packets into the memory 250. Thereafter, the section 230 reads out the data stored in the memory 250 and sends them to the computer 400 by way of the network 500 as the "recording IP packets", as shown by the reference character A11.

Thus, ordinary bidirectional voice communication or conversation is possible between the terminals 100 and 211 while the voice data of the communication is recorded by the computer 400. The recording computer 400 stores the voice data into its storage 410, as shown in FIG. 5.

The recording IP packets from the terminal 100 and the circuit 220 are transmitted to the computer 400 using the TCP. Therefore, even if some of these packets are lost during transmission, the packets thus lost are detected and resent to the computer 400 according to the TCP. This means that the lost recording packets are completely complimented.

The transmission period of the recording IP packets to the computer 400 increases due to the resending operation of the lost packets compared with that of the speech packets that are transmitted in real time. However, all the recording packets are stored in the memory 140 or 250, in other words, the memories 140 and 250 serve as buffer memories. Accordingly, all the recording packets are surely transmitted to the computer 400.

Subsequently, if the user of the local terminal 100 operates its recording button 160 in the recording mode, the operation of the terminal 100 is turned into the non-recording mode from the recording mode, as indicated by the reference character A12. Also, the terminal 100 transmits an IP packet for the "recording stop order" to the recording computer 400 by way of the network 500, as indicated by the reference character A13, In response to the recording stop order, the computer 400 transmits an IP packet for the "recording stop order" to the circuit 220 by way of the network 500, as indicated by the reference character A14. Thus, the operation of the circuit 220 is turned into the non-recording mode, as indicated by the reference character A15.

Finally, at the end of speech, the user of the terminal 100 places the handset 110 onto the body, the terminal 100 is turned into the on-hook state and transmits the disconnection signal to the circuit 220, as indicated by the reference character A16. In response to the disconnection signal, the circuit 220 disconnects the local terminal 100 from the circuit 220 (i.e., from the remote terminal 211).

Figure 7:
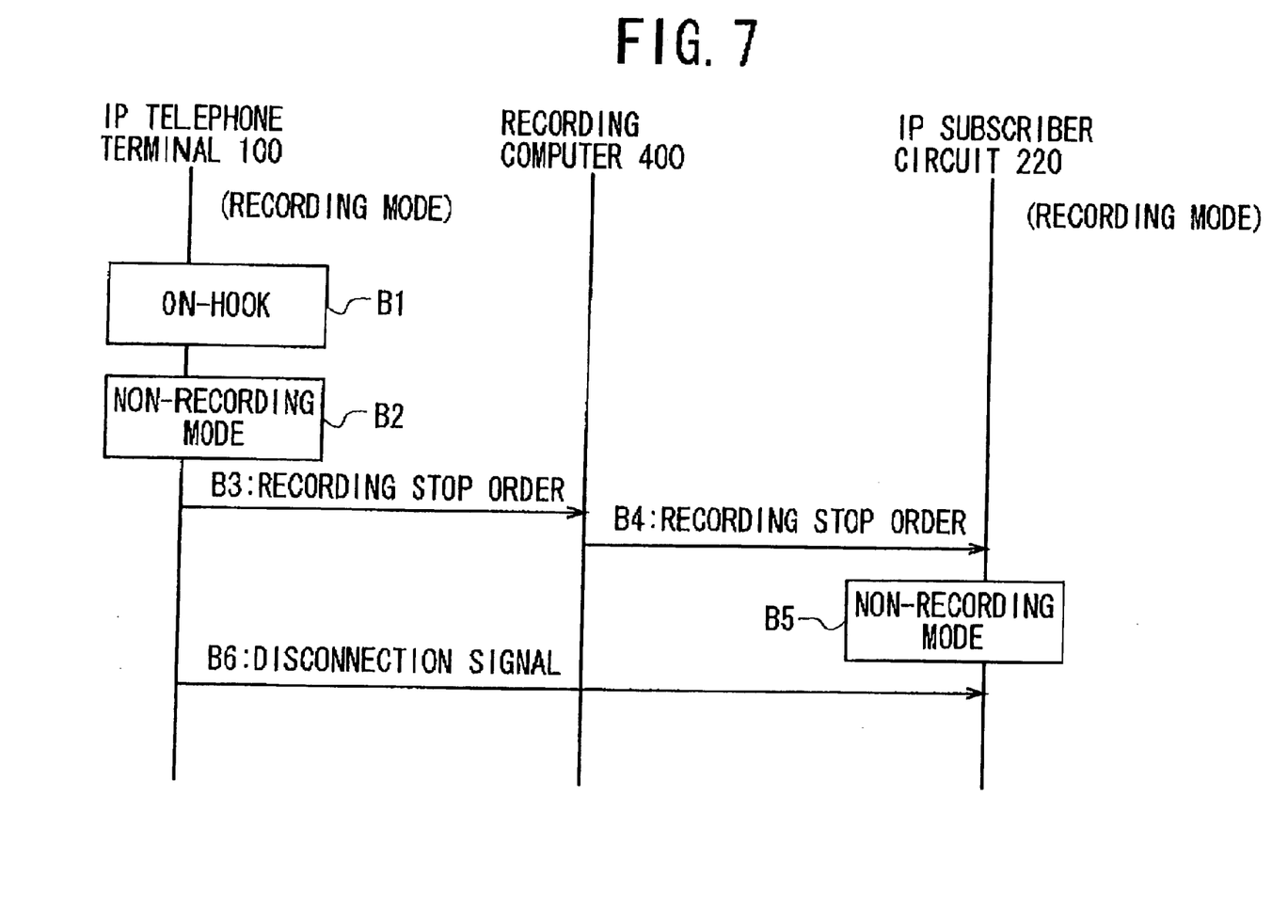
FIG. 7 is a sequence diagram showing the sequence of the operation of the system according to the first embodiment of FIG. 1, where the handset of the terminal is turned into the on-hook state in the recording mode.

FIG. 7 shows the sequence of the operation of the system according to the first embodiment of FIG. 1 when the user of the terminal 100 places the handset 110 onto the body and the terminal 100 is turned into the on-hook state in the recording mode.

When the terminal 100 is turned into the on-hook state in the recording mode, as indicated by the reference character B1, the terminal 100 is turned to the non-recording mode, as indicated by the reference character B2. Then, the terminal 100 transmits an IP packet for stopping the recording operation (i.e., the recording stop order) to the recording computer 400, as indicated by the reference character B3. In response to the order, the computer 400 transmits an IP packet for stopping the recording operation (i.e., the recording stop order) to the subscriber circuit 220, as indicated by the reference character B4. In response to the order, the circuit 220 is turned into the non-recording mode, as indicated by the reference character B5. Thereafter, the terminal 100 transmits a disconnection signal to the circuit 220, thereby disconnecting the local terminal 100 from the remote terminal 211 and finishing the speech, as indicated by the reference character B6.

Figure 8:
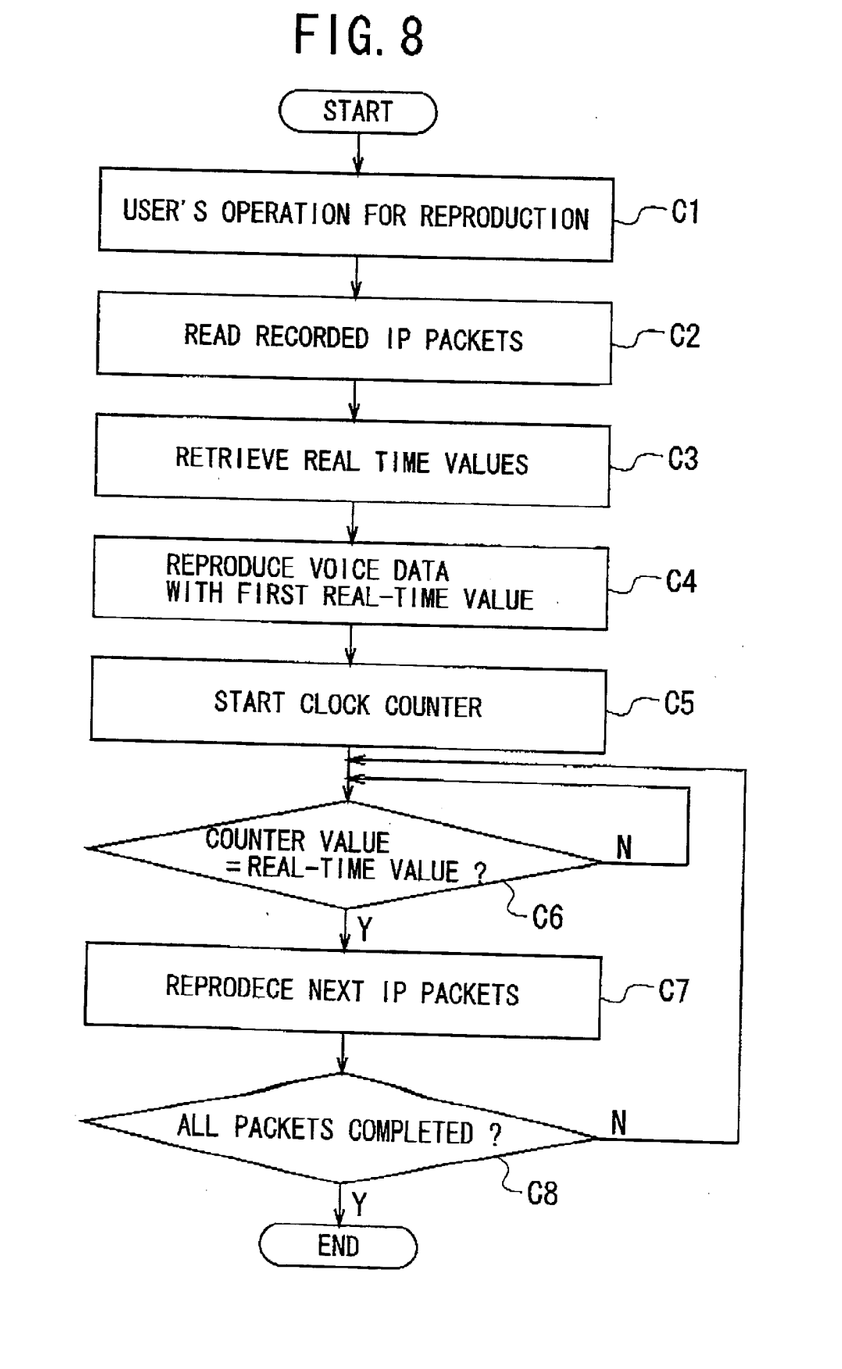
FIG. 8 is a flowchart showing the flow of the operation of the system according to the first embodiment of FIG. 1 in the reproduction mode.

FIG. 8 shows the flow of the operation of the recording computer 400 in the system 10 according to the first embodiment of FIG. 1 in the data reproduction mode.

If the user of the local terminal 100 operates the recording computer 400 to reproduce a series of the voice data of a desired speech stored in the storage 410 in the step C1, the computer 400 reads out the series of the data from the storage 410 in the step C2. Thereafter, the computer 400 retrieves the real time values of the data in the step C3. In the next step C4, the computer 400 reproduces the voice data corresponding to the first one of the recording IP packets with the first real-time value.

In the step C5, the clock counter 411 built in the computer 400 is started or activated, thereby counting the time. In the step C6, the computer 400 judges whether or not the value of the counter 411 is equal to the real-time value of the second packet. If the result of this comparison is "No", the computer 400 waits until the result is "Yes". When the result is "Yes", the computer 400 reproduces the voice data corresponding to the second one of the recording IP packets with the second real-time value in the step C7.

The same process steps as above are repeated until all the packets are completed in the step C8. If the result is "yes" in the step C8, the flow is finished.

Figure 9:
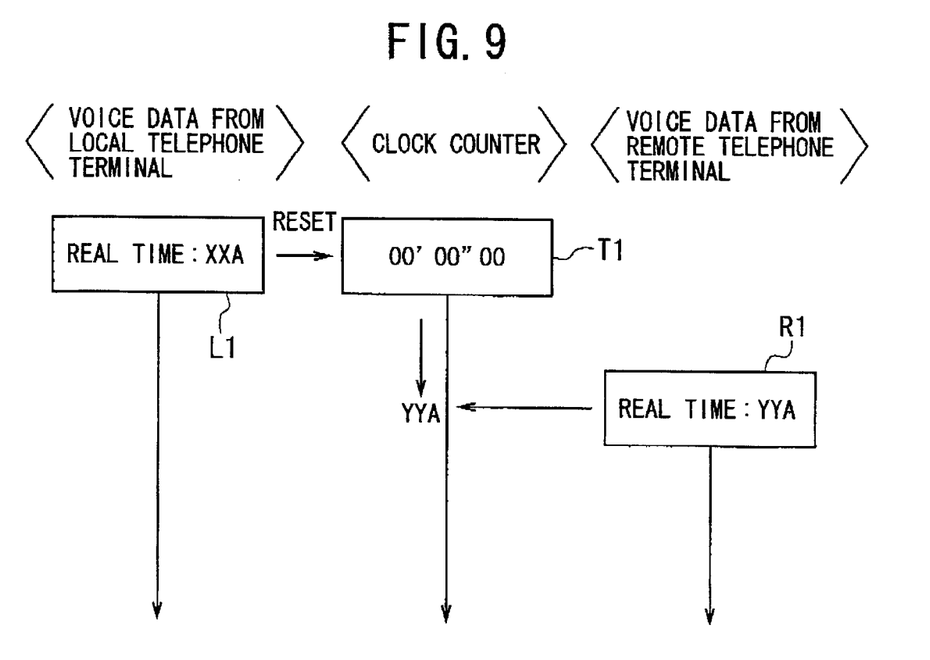
FIG. 9 is a schematic diagram showing the reproduction timing of the voice data corresponding to the respective IP packets in the system according to the first embodiment of FIG. 1 in the reproduction mode.

FIG. 9 shows the reproduction timing of the respective IP packets in the system 10 according to the first embodiment of FIG. 1 in the reproduction mode.

For example, the computer 400 reproduces the first voice data L1 from the local terminal 100 with the real time value of XXA 9 in the step C4. Then, the clock counter 411 built in the computer 400 is activated while using the first real time value XXA as the reference, thereby counting the time in the step C5.

In the steps C6 and C7, if the counter value of the clock counter 411 is equal to the real-time value of the subsequent or second packet, the computer 400 reproduces the voice data corresponding to the second one of the recording IP packets with the second real-time value. If the counter value of the clock 411 is equal to the real-time value YAA of the subsequent or second packet of the remote terminal 211, the computer 400 reproduces the voice data corresponding to the second one of the recording IP packets with the second real-time value.

Thus, the computer 400 reproduces a pack of the voice data corresponding to the recording IP packets for the desired speech that are reproduced in time series according to the real time values. Therefore, the computer 400 reproduces successively and independently the voice data for the local and remote terminals 100 and 211, reconstructing the desired speech. Since the recording packets are transmitted by using the TCP, lost packets are automatically resent to the computer 400 as desired. This means that none of the packets is lost.

With the sound recording system according to the first embodiment of the invention, as described above, the recording computer 400 connected to the IP-based network 500 is provided, where the computer 400 is capable of recording the voice data transmitted between the telephone terminals 100 and 211. When voice or speech communication is performed between the terminals 100 and 211, the "speech IP packets" corresponding to the voice data for the communication are formed and then, they are transmitted between the terminal 100 and the subscriber circuit 220 by way of the network 500 in approximately real time. On the other hand, the "recording IP packets" corresponding to the voice data are formed and then, they are transmitted to the computer 400 by way of the network 500 in the way that does not cause any IP packet loss during transmission and that is not performed in real time. The voice data thus transmitted is recorded by the computer 400.

Thus, the voice or speech communication is performed with the "speech IP packets" transmitted over the network 500 in real time. At the same time as this, the voice data transmitted by the "recording IP packets" is recorded by the computer 400, where the "recording IP packets" are not lost during transmission and the transmission is not carried out in real time.

Accordingly, if the voice data stored in the computer 400 is read out for reproduction after the speech or communication is finished, all the voice data transmitted by the "speech IP packets" without IP packet loss over the network 500 can be reproduced. In other words, the necessity of the lost-packet complementing function for the lost IP packets is eliminated, which realizes defect-free speech or voice communication between the terminals 100 and 211.

In the above explanation, speech or conversation is made between the local IP telephone terminal 100 directly connected to the IP-based network 500 and the remote, ordinary telephone terminal 211 connected indirectly to the network 500 by way of the subscriber circuit 220. However, the invention is not limited to this case. The invention is applicable to the case where speech is made between the IP terminal 100 and the IP terminal 100A connected directly to the network 500, as shown in FIG. 1.

Second Embodiment

Figure 10:
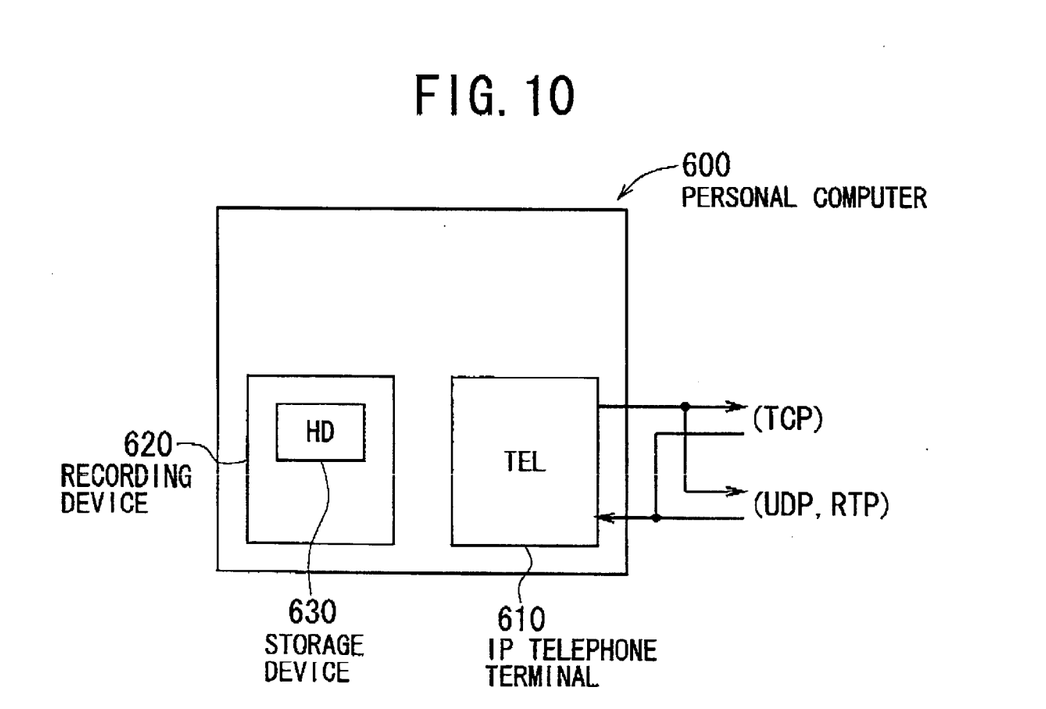
FIG. 10 is a functional block diagram showing the configuration of a personal computer serving as the IP telephone terminal and the recording device in a data recording system for the IP telephone according to a second embodiment of the invention.

FIG. 10 shows the configuration of the IP telephone terminal and the recording device used in a data recording system for IP telephony according to a second embodiment of the invention.

As seen from FIG. 10, an IP telephone terminal 610 and a recording device 620 are built in a personal computer 600. The device 620 includes a storage device 630 having the same function as the storage device 410 of the computer 400.

The telephone terminal 610 is formed by the combination of hardware and software running on the computer 600, which produces the same function as the IP telephone terminal 100 used in the first embodiment. The recording device 620 also is formed by the combination of hardware and software running on the computer 600, which produces the same function as the recording computer 400 used in the first embodiment.

With the data recording system for IP telephony according to the second embodiment, there are the same advantages as those in the first embodiment. There is an additional advantage that the recording and reproducing operations of the voice/audio data corresponding to the "recording IP packets" are easily performed if the user operates the telephone terminal 610. There is another additional advantage that the recording device 620 can be formed by a storage device (e.g., a hard disk drive) built in the computer 600.

Variations

Needless to say, the invention is not limited to the above-described first and second embodiments. Any change may be added to these embodiments.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A data recording system for Internet Protocol (IP) telephony, comprising:
 (a) an IP-based network;
 (b) a first telephone terminal connected to the network;
  the first telephone terminal being capable of transmission and reception of audio data in the form of IP packets, making communication using an IP;
 (c) a second telephone terminal connectable directly to the network or indirectly thereto by way of an exchange;
  the second telephone terminal being capable of communication; and
 (d) a recording device connected to the network;
  the recording device being configured for recording bi-directional audio data transmitted between the first telephone terminal and the second telephone terminal, wherein when communication is performed between the first telephone terminal and the second telephone terminal, speech IP packets corresponding to audio data for the communication are formed and then, the speech IP packets thus formed are transmitted between the first telephone terminal and the second telephone terminal by way of the network in approximately real time, wherein, in additional to the speech IP packets, recording IP packets corresponding to the audio data for the communication are formed by the first telephone terminal and then, the recording IP packets are transmitted to the recording device by way of the network in a way that does not cause any IP packet loss during transmission and that is not performed in real time, thereby recording the audio data by the recording device, and wherein a bi-directional voice communication occurs between the first and second telephone terminals with the speech IP packets while, concurrently, the transmitted recording IP packets records the bi-directional audio data transmitted between the first telephone terminal and the second telephone terminal at the recording device.

2. The system according to claim 1, wherein the recording IP packets are transmitted from the first telephone terminal to the recording device using the TCP for the transport layer of the OSI reference model.

3. The system according to claim 2, wherein the speech IP packets are transmitted over the network using the UDP and the RTP.

4. The system according to claim 1, wherein the recording device is designed to be recordable only when the first telephone terminal is in an off-hook state.

5. The system according to claim 1, wherein the recording device starts its recording operation based on a recording start order emitted from the first telephone terminal.

6. The system according to claim 1, wherein the recording device is designed to finish its recording operation by an on-hook operation of the first telephone terminal.

7. The system according to claim 1, wherein the recording device finishes its recording operation based on a recording stop order emitted from the first telephone terminal.

8. The system according to claim 1, wherein the recording device is designed to record in such a way that the speech IP packets from the first telephone terminal and those from the second telephone terminal or the exchange are independent from each other.

9. The system according to claim 8, wherein the recording device is designed to record a real time value of a first one of the recording IP packets from the first telephone terminal and a real time value of a first one of the recording IP packets from the second telephone terminal or the exchange.

10. The system according to claim 8, wherein the recording device is designed to reproduce the recorded audio data from the first telephone terminal and the recorded audio data from the second telephone terminal or the exchange according to their real time sequence, respectively.

11. The system according to claim 1, wherein the recording device is formed by an information-processing device connected to the network.

12. The system according to claim 1, wherein the first telephone terminal and the recording device are united together.

13. The system according to claim 1, wherein the second telephone terminal is connected indirectly to the network by way of the exchange; and wherein the second telephone terminal is capable of voice or speech communication with the first telephone terminal by way of the exchange and the network.

14. The system according to claim 1, wherein the second telephone terminal is connected directly to the network; and wherein the second telephone terminal is capable of transmission and reception of the audio data in the form of IP packets, making voice or speech communication using the IP.

15. A data recording system for Internet Protocol ("IP") telephony, comprising:

an IP network;

an IP telephone terminal connected to the IP network, the IP telephone terminal being a terminal for realizing IP telephony with an interface to the IP network for IP packet transmission, the IP telephone terminal comprising a handset, a transmitter section, a receiver section, a phone memory, and the interface;

an exchange connected to the IP network, the exchange comprising an IP subscriber circuit with memory;

a recording computer, configured as a data recorder, connected to the IP network; and a non-IP telephone terminal connected to the IP network via the exchange, wherein, a user's voice at the IP telephone terminal is converted into an audio signal, the audio signal thus formed is sent to the transmitter section and then, sent out to the IP network in the form of IP packets, in an off-hook state of the handset, the telephone terminal has i) a recording mode where the user's voice is recorded by the recording computer, and ii) a non-recording mode where the user's voice is not recorded by the recording computer, in the non-recording mode, the transmitter section generates speech IP packets corresponding to the electric audio signal of the user's voice and, using the UDP and the RTP for the transport layer of the OSI reference model, transmits the generated speech IP packets to the IP network and to the IP subscriber circuit of the exchange, in the recording mode, the transmitter section generates the speech IP packets and transmits the speech IP packets to the subscriber circuit while concurrently storing data of the speech IP packets in the phone memory, the transmitter section reads out the data from the phone memory and transmits the data as recording IP packets to the recording computer using TCP, without the UDP and the RTP, for the transport layer of the OSI reference model, and in the recording mode, a bi-directional voice communication occurs between the IP telephone terminal and the non-IP telephone terminal while, at the same time, the data of the speech IP packets are stored at the recording computer.

16. The system of claim 15, wherein, the IP telephone terminal further comprises a recording button for switching between the recording mode and the non-recording mode of the transmitter section and at the same time, a specific IP packet for instructing the start and end of the recording operation of the recording computer is transmitted from the IP telephone terminal toward the recording computer.

17. The system of claim 15, wherein, in the recording mode, the transmitter section retransmits any lost recording IP packets to the recording computer using TCP, without the UDP and the RTP, for the transport layer of the OSI reference model to achieve a lossless data transmission from the phone memory to the recording computer.

18. The system of claim 17, wherein, the recording computer is configured to record a two-way voice conversation between the IP telephone terminals and the non-IP telephone, the recording computer receiving recording IP packets from both IP telephone terminal and the non-IP telephone terminal.

19. A data recording system for Internet Protocol ("IP") telephony, comprising:

an IP network;

a IP telephone terminal connected to the IP network, the IP telephone terminal being a terminal for realizing IP telephony with an interface to the IP network for IP packet transmission, the IP telephone terminal comprising a handset, a transmitter section, a receiver section, a phone memory, the interface;

an exchange connected to the IP network, the exchange comprising an IP subscriber circuit with memory;

a recording computer, configured as a data recorder; and a non-IP telephone terminal connected to the IP network via the exchange, wherein, a user's voice at the IP telephone terminal is converted into an audio signal and sent out to the IP network in the form of IP packets, the telephone terminal having a recording mode where the user's voice is recorded by the recording computer, in the recording mode, the transmitter section i) generates speech IP packets corresponding to the audio signal of the user's voice and, using the UDT and the RTP for the transport layer of the OSI reference model, transmits the generated speech IP packets to the IP network and to the IP subscriber circuit of the exchange, ii) stores data of the speech IP packets in the phone memory, and iii) reads out the data from the memory and transmits the data as recording IP packets to the recording computer using TCP, without the UDP and the RTP, for the transport layer of the OSI reference model, so that in the recording mode, a bi-directional voice communication occurs between the IP telephone terminal and the non-IP telephone terminal while, at the same time, the data of the speech IP packets are stored in the phone memory and then sent to the recording computer for storage at the recording computer.

20. The system of claim 19, wherein, a personal computer comprises the IP-terminal and the recording computer, and the recording computer is configured to record a two-way voice conversation between the IP telephone terminal and the non-IP telephone, the recording computer receiving recording IP packets from both IP telephone terminal and the non-IP telephone terminal.

21. A data recording system for IP telephony, comprising:

a first telephone terminal connectable to an IP-based network for communication, via IP packets, with a second telephone terminal operatively connected to the network, the first telephone terminal comprising:

a transceiver handset with a microphone and speaker, a transmitter section connected to receive audio from the handset as an electrical audio signal and convert the audio signal to speech IP packets, a record-mode selector connected to the transmitter section to toggle the transmitter section between a recording mode and a non-recording mode, a receiver section connected to send audio to the handset, a memory bidirectionally connected to the transmitter section, an interface connected for reception from the transmitter section and for transmission to the receiver section, the interface also having interconnections for connection to the IP-based network to provide transmission and reception of IP packets using i) TCP as a transport layer and ii) UDP and RTP as the transport layer, wherein, in the non-recording mode, the transmitter section generates speech IP packets corresponding to the audio signal generated by the microphone and the thus-generated speech IP packets are sent to the second telephone by via the network, the interface transmitting the speech IP packets using the UDP and RTP as the transport layer, and in the recording mode, the transmitter section i) generates the speech IP packets corresponding to the audio signal generated by the microphone and the thus-generated speech IP packets are sent to the second telephone by via the network, the interface transmitting the speech IP packets using the UDP and the RTP as the transport layer, and ii) at the same time as generating the speech IP packets, the transmitter section stores data of the speech IP packets in the memory, the transmitter section thereafter reads out the data from the memory and transmits the data, as recording IP packets, via the interface, using the TCP for the transport layer.

22. The data recording system for IP telephony of claim 21, further comprising:

a recording computer connectable to the network, wherein, in the recording mode, the transmitter section sends the recording IP packets, using the TCP for the transport layer, to the recording computer, so that the recording computer records the converted audio signal previously stored in the memory, and in the non-recording mode, the recording computer does not record the converted audio signal; and the second telephone terminal, wherein, the recording computer, upon receipt of a first recording start order from the first telephone terminal, is placed in a recording state and the recording computer issues a second recording start order to the second telephone terminal to place the second telephone terminal in the recording mode so that the first and second telephone terminals concurrently transmit speech IP packets, using the UDP and the RTP, to each other, and concurrently transmit recording IP packets, using the TCP, to the recording computer, when in the recording state, the recording computer receives the recording IP packets transmitted from the first telephone terminal and from the second telephone terminal, and the received recording IP packets are stored on an auxiliary storage device.

* * * * *